April 30, 1929.  J. TUREK  1,710,848

WATER CONTROL MEANS FOR RADIATORS

Filed Feb. 26, 1927

Inventor

John Turek

By *Clarence A. O'Brien*
Attorney

Patented Apr. 30, 1929.

1,710,848

UNITED STATES PATENT OFFICE.

JOHN TUREK, OF McKEES ROCKS, PENNSYLVANIA.

WATER-CONTROL MEANS FOR RADIATORS.

Application filed February 26, 1927. Serial No. 171,337.

My present invention pertains to water controlled means for radiators; and consists in the peculiar and advantageous means, hereinafter described and definitely claimed, for maintaining hot water heating radiators in a full condition with a view to increasing the efficiency of such radiator.

In the accompanying drawings, forming a part of this specification:—

Similar numerals of the reference designate corresponding parts in all the views of the drawings.

Figure 1:
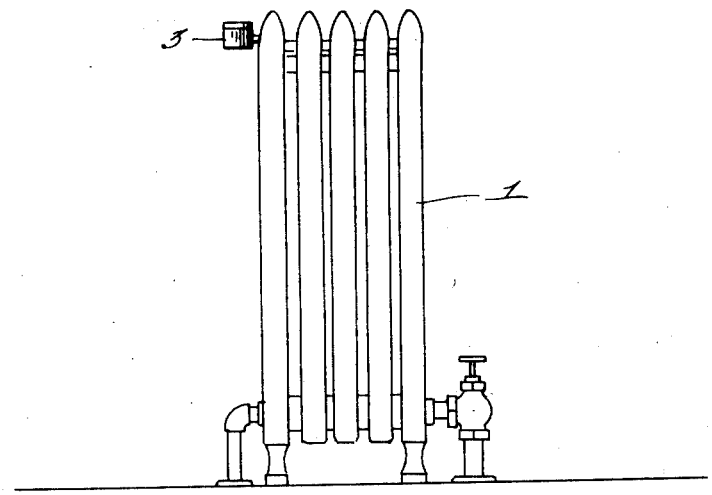
Figure 1 is a side elevation illustrating a radiator such as comprised in a hot water heating system, equipped with the preferred embodiment of my invention.

The radiator shown in Figure 1 and designated by 1 is not of my invention. The said radiator is provided at one end in its upper portion with a threaded aperture for the connection ordinarily of a pet cock, but I employ the said aperture to receive the threaded tube extension 2 on the casing body 3 of my novel control means.

In addition to the casing body 3, my novel control means comprises a top 4 threaded at 5 into the casing body 3 and serving to confine packing 6 against the casing body with a view to preventing leakage.

Figure 2:
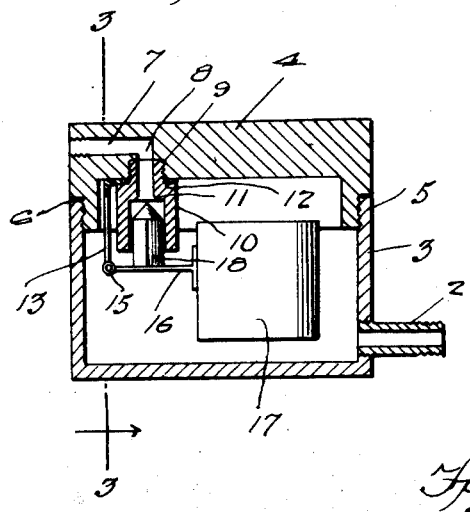
Figure 2 is an enlarged vertical section of my novel control means.
Figure 3:
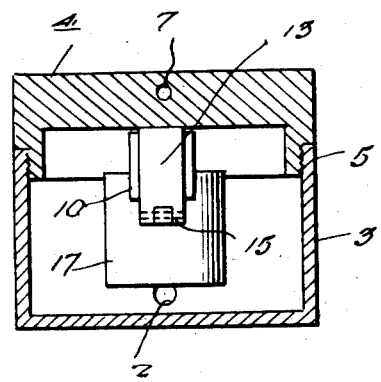
Figure 3 is a section through the control means taken on the plane indicated by the line 3—3 of Figure 2, looking toward the right.
Figure 4:
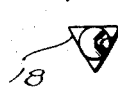
Figure 4 is an inverted plan view illustrative of the valve comprised in my improvement.

The top 4 is of heavy character, as brought out in Figures 2 and 3, and in the said top 4 is a horizontal aperture 7 which is merged at its inner end into a vertical aperture 8, the lower end of the said aperture 8 being surrounded by a socket 9, the wall of which is threaded as illustrated. The apertures 7 and 8 constitute an air vent, but I would have it understood that when deemed expedient the outer end of the aperture 7 may be threaded for the connection of a pet cock, not shown, when the employment of a pet cock is deemed expedient as when, for some reason the needle valve hereinafter described may not tightly seat.

It will be understood from the foregoing that no pet cock is employed on the casing of my novel control means unless there is some impairment in the mechanism within the casing of the control means.

Threaded into the socket 9 and thereby connected to the top of the casing is a tubular member 10 in which is a valve seat 11. A reduced portion of the member 10 is let into the threaded aperture 9, and at the base of the said reduced portion is a shoulder 12 on the member 10 as clearly shown in Figure 2.

At 13 is a bracket comprised in my improvement. This bracket comprises a pendent portion and also comprises a plate 14 disposed at right angles to the pendent portion 13, the said plate 14 being apertured to surround the reduced portion of the member 10, and to rest on the shoulder of the said member 10 and to be strongly clamped and held between the said shoulder and the casing top 4. Manifestly in this manner the member 10 may be utilized to advantage in the connection of the bracket 13 to the casing top 4, and this without the assistance of any extraneous means whatsoever.

Hingedly connected at 15 to the lower end of the pendent portion of the bracket 13 is a vertically swingable lever 16 carried by which is a float 17. Also carried by the vertically swingable lever 16 is a valve 18 of triangular form in horizontal section, said valve having a conical upper end 19 designed to bring up against the value seat in the member 10 and extend above the said valve seat in the upper tubular portion of the member 10.

The bore in the lower portion of the member 10 is circular in horizontal section, and by virtue of the valve 18 being of triangular form in horizontal section and of a size so that the apices of its angles are disposed against the wall of said bore, the valve 18 will be adequately guided in its rectilinear movement, and yet when the tapered end of the valve is removed from its seat, there will always be ample spaces between the sides of the valve 18 and the wall of the bore in the member 10 for the free passage of air to the vent 7.

It will be apparent from the foregoing that the valve 18 will be held away from its seat in the member 10 until the radiator 1 is completely discharged of air and is filled with water, whereupon the water acting through the float 17 will close the valve 18 and will positively hold said valve 18 against its seat with a view to preventing the discharge of water from the radiator 1. It will also be apparent that in the event of the water in the radiator 1 dropping, the float 17 will also drop and open the valve 18, whereupon air will be discharged from the radiator 1 until the said radiator is again occupied fully with water whereupon the valve 18 will be tightly closed and will be maintained in a closed state until the water again drops in the radiator 1.

It follows that when a radiator is equipped with my novel control means, the radiator will be at all times fully occupied by water and its efficiency will be increased.

It will further be appreciated from the foregoing that my novel control means is readily attachable to conventional radiators such as 1 without the employment of skilled labor or without the employment of tools of any kind, it being simply necessary to use the casing of my novel device as a handle for the purpose of screwing the tube 2 into the threaded aperture in the radiator 1, care of course being taken to see that the casing is so positioned that the vent aperture 7 will be adjacent the uppermost portion of the casing.

It will further be appreciated from the foregoing that in general my novel control means is simple and inexpensive in construction and is free of delicate parts such as are likely to get out of order after a short period of use.

I have explicitly described the preferred embodiment of my invention in order to impart a full, clear, and exact understanding of the said embodiment. I do not desire, however, to be understood as limiting myself to the precise construction shown and described, my invention being defined by my appended claim within the scope of which modifications may be made without departure from my invention.

Having thus described the invention, what I claim is:—

Water control means for radiators comprising a casing body having a threaded tubular portion extending therefrom adjacent to the bottom thereof and adapted to be turned through the medium of the casing body into a threaded aperture in a radiator, a top detachably connected to the casing body and having a vertically and horizontally extending air vent and also having a threaded socket into which the vertical portion of said vent merges, a tubular member having a differential bore and also having an upper reduced threaded portion and a shoulder at the lower end of said threaded portion, said reduced portion being threaded into the socket in the top of the casing, a pendent bracket arranged alongside said tubular member and having at its upper end a plate disposed at right angles to its pendent portion, and apertured and surrounding the reduced upper end of the tubular member and interposed between the shoulder of said member and the under side of the casing top, a vertically swingable lever hingedly connected to the pendent portion of the bracket and equipped with a float movable alongside the tubular member, and a valve on said vertically swingable lever movable rectilinearly in the larger portion of the bore of the tubular member.

In testimony whereof I affix my signature.

JOHN TUREK.